Patented Dec. 16, 1947

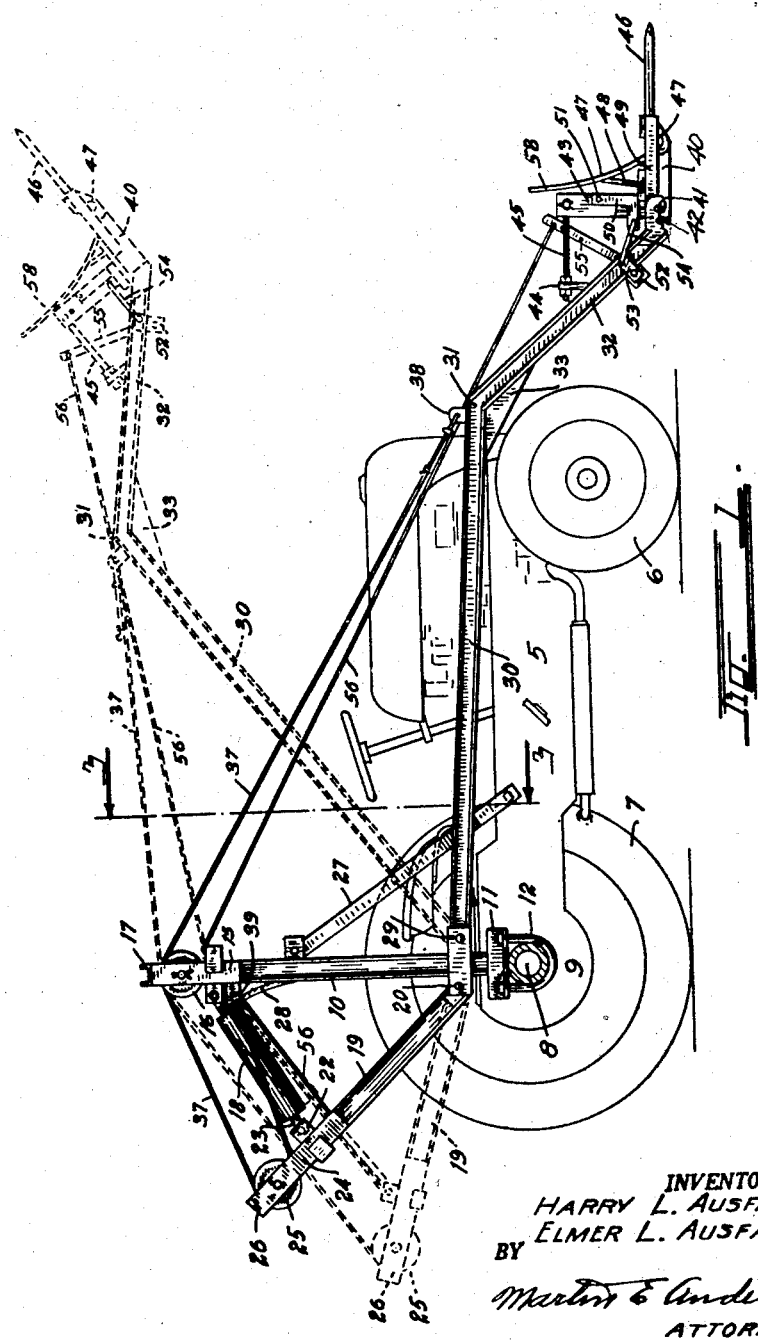

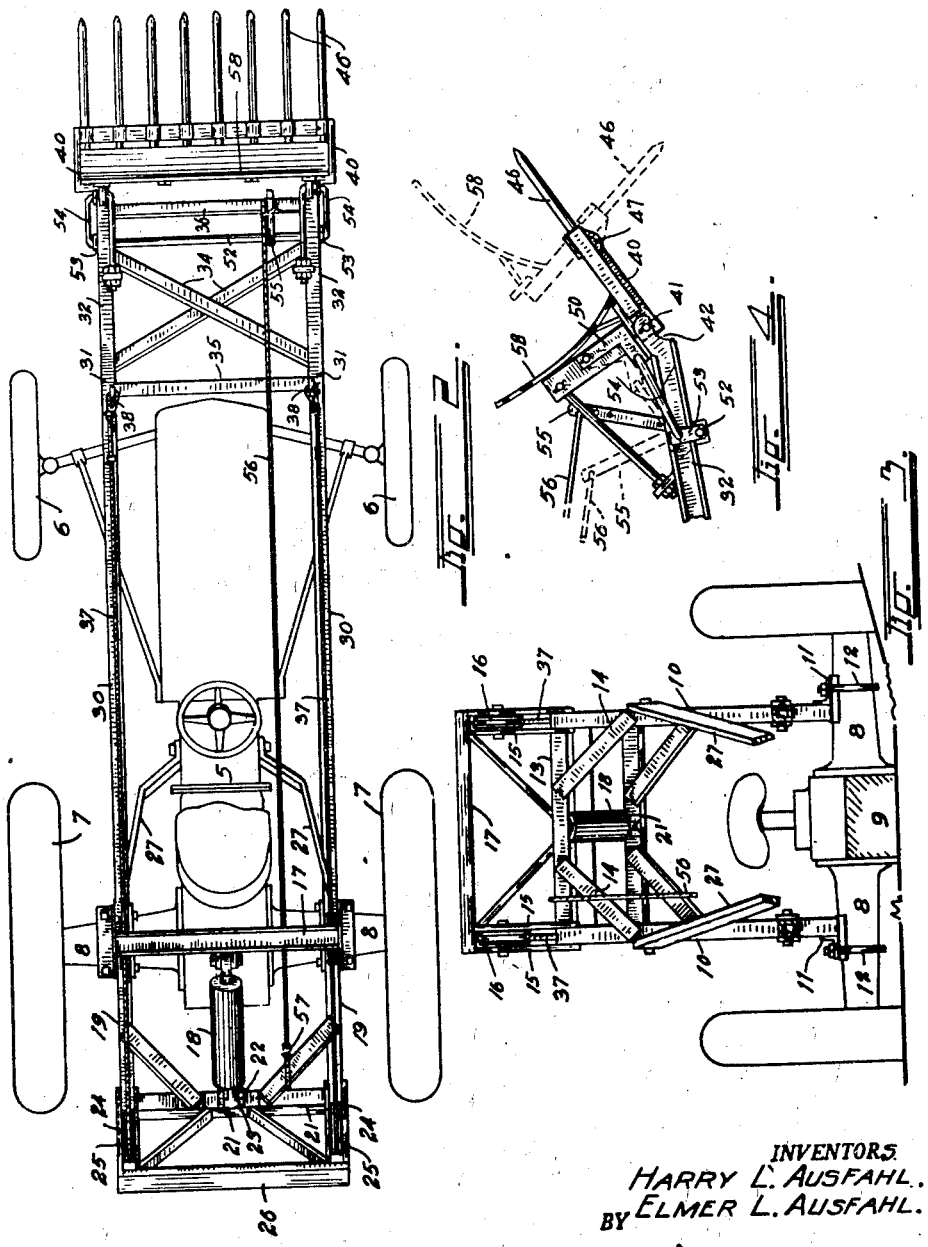

2,432,645

UNITED STATES PATENT OFFICE 2,432,645

POWER LOADER

Harry L. Ausfahl and Elmer L. Ausfahl,
Englewood, Colo.

Application June 28, 1946, Serial No. 680,220

3 Claims. (Cl. 214—140)

This invention relates to improvements in power shovels or loaders of the type some times referred to as "manure loaders."

The extensive use of tractors on the farms has resulted in the invention of many different forms of attachments that are of great value and importance.

Among one of the most widely used attachments for tractors is a power operated fork or shovel which can be employed for a large variety of purposes.

Tractors as they are manufactured today, as a rule, come equipped with pumps by means of which oil under high pressure can be provided for the operation of hydraulic apparatus.

This invention relates to a hydraulically operated shovel of such construction that it can be quickly attached to and removed from a tractor.

It is an object of this invention to produce an attachment of the type specified which shall be of a very simple and substantial construction and of such a design that part thereof can be left on the tractor without interfering with the normal use thereof.

Another object of the invention is to produce an attachment of such design that the operating parts thereof are situated mostly to the rear of the operator's seat and are of such a design that they do not interfere with the operator.

Another object is to produce an attachment of such construction that the lifting arms and the shovel or fork are moved by means of a hydraulic cylinder connected to a hinged frame that is mounted for pivotal movement about pivots located substantially above the rear axle and from which the lifting force is transmitted to the shovel by means of cables.

The above and any other objects that may become apparent as this description proceeds are attained by means of a construction and an arrangement of parts that will now be described in detail and for this purpose, reference will be had to the accompanying drawing in which the invention has been illustrated in its preferred form and in which:

Figure 1 is a side elevation of a tractor showing the attachment in place thereon;

Figure 2 is a top plan view;

Figure 3 is a section taken on line 3—3, Figure 1; and

Figure 4 is a side elevation of the fork latching and releasing device.

In the drawing reference numeral 5 designates the body of a tractor whose front wheels have been designated by reference numeral 6 and the rear wheels by reference numeral 7. The rear axle has been designated by reference numeral 8 and is of the usual construction comprising two axle housings extending in opposite directions from a gear casing 9. The construction of the tractor has not been shown with greater detail than necessary as the invention relates to the attachment and the tractor has merely been illustrated so as to facilitate the description.

Extending upwardly from the rear axle housing is a frame comprising vertical members 10 that are provided at their lower ends with cross brackets 11 which are attached to the axle housing by U-bolts 12 or by any other suitable means. The upper ends of members 10 are connected by a cross bar 13 and the assembly is provided with diagonal braces 14 to give it rigidity. Extending upwardly from each vertical member 10 are two spaced bars 15 between which is pivoted a pulley 16. The tops of members 15 are interconnected by a channel iron 17. Pivotally connected with cross bar 20 is a hydraulic cylinder 18.

A tiltable frame comprising two parallel channel irons 19 having their lower ends pivoted at 20 and their upper free ends connected by a transverse member 21, carry a bracket 22 to which the piston rod 23 is pivotally connected. The piston rod is, of course, provided with a piston that is positioned within the cylinder in a manner common in hydraulic jack constructions. Extending upwardly from each side members 19 are two spaced bars 24 between which and to which are pivotally connected pulleys 25. The outer ends of bars 24 are connected by a cross bar 26 as shown most clearly in Figure 2. The vertical bars 10 are braced to the tractor frame by means of diagonal braces 27. A flexible tube 28 connects the interior of the cylinder with the high pressure oil pump. The pump and the control valve have not been shown because they are parts of the tractor and form no part of this invention except to the extent that they furnish the necessary fluid for operating the hydraulic cylinder.

Pivotally connected to the vertical arms 10 at points 29 are two lifter arms 30, one on each side of the tractor. These arms comprise a straight section extending from the pivot to point 31 and are then downwardly and forwardly inclined as shown at 32. Braces 33 are provided at the bends so as to give added strength and rigidity. The parts designated by reference numeral 32 are interconnected by diagonal braces 34 as shown most clearly in Figure 2 and at points 31 a cross bar 35 is provided. The bar 35 and braces 34 give rigidity to the lifting arm structure which is further increased by means of the transverse bar 36.

Two cables 37, one for each lifting arm 30, are connected with the lifting arm structure at points 38 and pass over pulleys 16 and from thence rearwardly around pulleys 25 and have their ends anchored to the vertical frame at point 39.

It is now apparent that pulleys 25 are positioned in the bights of the cables and that every time the pivots of pulleys 25 move rearwardly one unit of distance, the point 28 where the cables are connected to the lifting arms, moves two units, thereby increasing the height to which the lifting frame is moved for each degree of rearward movement of the pivot frame. The parts have been so proportioned and adjusted that when the pivot frame comprising members 19 is in the dotted line position shown in Figure 1, the lifting arms will also be in the dotted or broken line position.

Pivotally connected with the front ends of the lifting arms or to the lower and front ends of the downwardly inclined portions 32, is a fork. The fork is provided with end members 40 that are pivoted at 41 to the forwardly extending webs 42 of the channel portions 32. Each member 40 has an upwardly extending arm 43 that is integral therewith and the upper end of this is connected to bracket 44 by means of a rod 45. The angular relation between the parts 43 and 40 with respect to parts 32 can be adjusted by means of the nuts on bars 45. The fork itself, which comprises the teeth 46, is pivoted at 47 to the front ends of arms 40 and has an upwardly extending brace 47 that is held in position by means of braces 48. Secured to the fork so as to be tiltable therewith is a rearwardly extending arm 49. Latch members 50 are pivoted at 51 to the vertically extending arms 43 and are so positioned that when the fork is in the position shown in Figure 1, the lower end of the latch member will extend over the rear end of arm 49 and will therefore lock the fork in the position shown in Figure 1. In order to release the fork or permit it to tilt, it is necessary to move the latch members 50 rearwardly and this is effected by means of a rod 52, whose ends are provided with crank arms 53, the outer ends of which are connected by means of links 54 with the lower ends of latch members 50 as shown most clearly in Figures 2 and 4. A handle 55 is welded to the rod 52 and has connected to its upper end a rope or cable 56 that extends rearwardly to a point within easy reach of the operator and has been shown as anchored to the frame at 57. The fork is provided with a back 58 which is preferably made from sheet metal. The latch members 50 hold the fork in the full line position as shown in Figure 4, but by exerting tension on cable 56, rod 52 with its crank arms 53 are moved towards the dotted line position shown in Figure 4, thereby moving the latch members to inoperative position and permitting the fork to turn about pivot 47 to the dotted line position from which position, whatever load it carries will be dumped.

In the drawing the load carrying device has been shown as a fork but any other suitable device such as a shovel may be substituted for the fork.

Having described the invention what is claimed as new is:

1. In combination with a tractor having a wheel supported body, an engine and a power driven pressure pump, an inverted U-shaped frame secured to the tractor body adjacent its rear end, an inverted U-shaped frame positioned to the rear of the first mentioned frame and pivotally connected therewith at its lower end, a cylinder connected with one frame and a piston connected with the other frame, the cylinder and piston forming a hydraulic force producing means for urging the frames apart, each frame having a pulley at each upper corner, a pair of lifter arms, one on each side, pivoted adjacent the lower end of the first mentioned U-shaped frame, a load carrying device secured to the front ends of the lifting arms, and cables extending from near the front ends of the lifting arms, over the pulleys and back to the first mentioned U-frame, whereby when the two U-frames are angularly separated by the hydraulic mechanism the lifting arms and load carrying device will be raised.

2. A power loader comprising, in combination with a tractor having a wheel supported body, an engine and a power driven pump, a bar extending upwardly from each side of the tractor, the upper ends of the bars being interconnected to form an inverted U-shaped frame, a pulley adjacent each upper corner of the frame, a second inverted U-shaped frame positioned to the rear of the first frame with its lower ends pivotally connected therewith, a hydraulic pressure exerting device comprising a cylinder and a piston interconnecting the two frames adjacent their upper ends, the second mentioned U-shaped frame having a pulley adjacent each corner, a pair of lifting arms, one on each side of the body, pivoted at their rear ends adjacent the lower end of the first mentioned frame, a fork of the like connected with the front ends of the arms, and cables, having their front ends connected with the arms, passing over the pulleys, with their other ends anchored to the first frame, whereby when the angular relation between the two frames is increased the front ends of the arms and the fork will be raised.

3. A device in accordance with claim 1 in which the front ends of the lifting arms are offset downwardly.

HARRY L. AUSFAHL.
ELMER L. AUSFAHL.

REFERENCES CITED

The following references are of record in the file of this patent:

UNITED STATES PATENTS

| Number | Name | Date |
| --- | --- | --- |
| 1,405,652 | Wolfe | Feb. 7, 1922 |
| 1,834,822 | Boling | Dec. 1, 1931 |
| 1,985,285 | Erdahl | Dec. 25, 1934 |
| 2,404,820 | Wuertz et al. | July 30, 1946 |